United States Patent
Irnich et al.

(10) Patent No.: US 10,927,274 B2
(45) Date of Patent: Feb. 23, 2021

(54) ARTICLE COMPRISING EXPANDED TPU AND A WATER BASED COATING

(71) Applicant: Covestro Deutschland AG, Leverkusen (DE)

(72) Inventors: Rolf Irnich, Bergheim (DE); Thomas Michaelis, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/622,989

(22) PCT Filed: Jun. 27, 2018

(86) PCT No.: PCT/EP2018/067211
§ 371 (c)(1),
(2) Date: Dec. 16, 2019

(87) PCT Pub. No.: WO2019/007770
PCT Pub. Date: Jan. 10, 2019

(65) Prior Publication Data
US 2020/0392370 A1 Dec. 17, 2020

(30) Foreign Application Priority Data
Jul. 4, 2017 (EP) ..................................... 17179593

(51) Int. Cl.
C09D 175/04 (2006.01)
C08G 18/08 (2006.01)
C08G 18/44 (2006.01)
C09D 169/00 (2006.01)
A43B 1/00 (2006.01)

(52) U.S. Cl.
CPC ....... *C09D 175/04* (2013.01); *C08G 18/0819* (2013.01); *C08G 18/44* (2013.01); *C09D 169/00* (2013.01); *A43B 1/00* (2013.01)

(58) Field of Classification Search
None
See application file for complete search history.

(56) References Cited

U.S. PATENT DOCUMENTS

| 3,330,828 | A | 7/1967 | Grogler |
| 4,474,934 | A | 10/1984 | Tanaka et al. |
| 5,914,383 | A | 6/1999 | Richter et al. |
| 2008/0004395 | A1 | 1/2008 | Covelli et al. |
| 2010/0222442 | A1 | 9/2010 | Prissok et al. |
| 2011/0077310 | A1 | 3/2011 | Koecher |
| 2012/0006528 | A1 | 1/2012 | Utathin et al. |
| 2013/0122223 | A1 | 5/2013 | Ambrose et al. |
| 2013/0122229 | A1* | 5/2013 | Ambrose ............. C08G 18/706 428/36.92 |
| 2013/0227861 | A1 | 9/2013 | Prissok et al. |
| 2014/0089055 | A1 | 3/2014 | Smith et al. |
| 2014/0227505 | A1 | 8/2014 | Schiller et al. |
| 2017/0080615 | A1 | 3/2017 | Bartl et al. |
| 2018/0155518 | A1* | 6/2018 | Koshita ....................... C08J 9/18 |
| 2018/0334532 | A1* | 11/2018 | Stache .................. C07F 7/1892 |

FOREIGN PATENT DOCUMENTS

| DE | 102008025614 A1 | 12/2009 |
| EP | 0197543 A | 10/1986 |
| GB | 1145952 A | 3/1969 |
| JP | 05286978 A | 11/1993 |
| WO | 199420568 A1 | 9/1994 |
| WO | 2005023920 A1 | 3/2005 |
| WO | 2007045586 A1 | 4/2007 |
| WO | 2013153153 A1 | 10/2013 |

OTHER PUBLICATIONS

International Search Report, PCT/EP2018/067211, dated Sep. 28, 2018, Authorized officer: Nuki West.
Laas et al., J. Prakt. Chem. 336, 1994, p. 185-200.

* cited by examiner

*Primary Examiner* — Robert T Butcher
(74) *Attorney, Agent, or Firm* — Jed C. Benson

(57) ABSTRACT

The present invention relates to an article comprising expanded thermoplastic polyurethane as a substrate and a specific polyurethane urea coating on said substrate, as well as footwear, a process for producing the article and a use of a polyurethane urea dispersion/solution. It has been found that a polyurethane urea coating comprising polycarbonate structural units strongly binds to expanded TPU substrates and maintains the intrinsic properties of the expanded TPU.

14 Claims, No Drawings

ARTICLE COMPRISING EXPANDED TPU AND A WATER BASED COATING

CROSS-REFERENCE TO RELATED APPLICATION

This application is a national stage application under 35 U.S.C. § 371 of PCT/EP2018/067211, filed Jun. 27, 2018, which claims the benefit of European Application No. 17179593, filed Jul. 4, 2017, each of which is incorporated herein by reference.

FIELD

The present invention relates to an article comprising expanded thermoplastic polyurethane as a substrate and a specific water based coating on said substrate, as well as footwear, a process for producing the article and a use of a polyurethane urea solution.

BACKGROUND

Expanded thermoplastic polyurethane (TPU) is known for its flexibility, elasticity and dampening properties (WO 94/20568A1). Commonly, expanded TPU is produced using an extrusion process of the constituents of the resulting thermoplastic polyurethane followed by a granulation process. Expansion of the particles can be induced either by steam or by hot air, by impregnating the particles with a propellant/blowing agent and subsequent heat treatment (WO2007/082838 A1) or using a masterbatch of for example microspheres containing the propellant/blowing agent (WO 2005/023920 A1). Various propellants/blowing agents are useful for expanding the particles (overview given in WO 2010/136398 A1).

For producing and shaping a respective article the expanded TPU usually is introduced into a mould and exposed to vapour and/or heat so that the outer surface of the expanded particles fuses. However, when transporting the expanded TPU particles, e. g. pouring them into the mould, but also transporting them in bags, barrels, through pipes, etc., those particles tend to adhere to each other causing clots and unfavourable depositions on the respective surfaces. This influences on the one hand the processability of the expanded TPU particles and on the other hand has a negative impact on controllability and reproducibility of the whole production process of an article.

Therefore, normally additives such as lubricants are added to the expanded TPU particles either during their production or afterwards in order to decrease the above-mention problem of adhesion (e. g. WO 2013/182555 A1). While these additives decrease or prevent the adhesion of the particles during transport, they also remain in and on the resulting article to be produced. Accordingly, any approach aiming at producing a coating on the resulting article comprising expanded TPU faces the problem that the lubricants on the article exhibit also a negative impact on the adhesion between the surface of the shaped expanded TPU and the coating itself.

Therefore, many experiments trying to successfully coat an expanded TPU substrate failed. This is further due to the fact that expanded TPU substrates are flexible and accordingly, a respective coating needs to adhere to the substrate even when this substrate is bent upon using (e. g. a shoe sole upon walking). Therefore, many coatings which are known to improve the resistance of rigid surfaces (e. g. chemical resistance, water resistance, scratch resistance, ultraviolet resistance and/or durability) such as for example acrylic coatings moreover, also crack and peel away from a flexible substrate which is flexed.

Nevertheless, it may be desired to coat those substrates in order to provide improved or decorated appearance, apply a pattern or enhance water resistance, chemical resistance, scratch resistance, ultraviolet resistance and/or durability.

There are approaches which describe dying of the expanded TPU particles themselves in order to improve the appearance of the expanded TPU substrate. WO 2014/052243 A1 as well as WO 2005/023920 A1 describe the addition of dyes in order to change the colour of the resulting article. However, the process of dying has the drawback that in principle the amount of dye which indeed is needed exceeds the amount of dye which would be needed in order to obtain the desired effect. Because only the outer surface of the resulting shaped article is visible, the dye which is inside the article is needless. This leads to increased costs when producing dyed articles comprising expanded TPU. Moreover, the dyes itself may influence the resulting properties of the expanded TPU article and accordingly need to be specifically adapted.

WO 2012/065926 A1 describes that the expanded particles firstly are freed from the adherent residues of auxiliaries via washing before a hybrid material with a 2 component polyurethane is produced. Washing is performed using nitric acid and water. This approach causes an additional step of cleaning and moreover, harsh substances are used for washing.

WO 2009/120560 A1 describes an article comprising foamed TPU which is coated with a waterborne 2 component coating composition. However, this document solely describes the use of foamed TPU substrates. TPU foams are produced using a completely different process than expanded TPU and therefore do not face the problem of lubricants being present on the outer surface of a respective substrate. Accordingly, this prior art document describes a coating on a surface of a foam which does not intrinsically need lubricants and therefore is free of them. For this reason the inventors found that the described coating adheres to the TPU foam.

SUMMARY

In view of this prior art it was an object of the present invention to overcome at least one, preferably all of the disadvantages known from the prior art. In particular, it was an object of the present invention to provide a coating which sufficiently adheres to expanded TPU. Moreover, it was a particular object of the present invention to provide a coating on expanded TPU which adheres even upon bending or flexing of the expanded TPU. Preferably, the expanded TPU should not be washed or freed of the lubricants which are present on its surface.

DETAILED DESCRIPTION

These objects have been accomplished by the article according to the present invention, the footwear of the present invention, the process for producing the article according to the present invention and the use according to the present invention as described in detail below.

According to the present invention an article is provided comprising expanded thermoplastic polyurethane as a substrate and a coating on at least a part of said substrate, wherein the coating is obtained by curing a polyurethane urea solution/dispersion comprising at least water as solvent, characterized in that the polyurethane urea comprises polycarbonate structural units.

It has been surprisingly found that a polyurethane urea solution/dispersion, wherein the polyurethane urea comprises polycarbonate structural units, adheres to an expanded TPU substrate. Moreover, it has been surprisingly found that the adhesion of the coating on the expanded TPU is sufficient even in the presence of lubricants on the expanded TPU. Therefore, no washing step or removal of the additives being present on the surface of the expanded TPU due to its production process is necessary.

Without wishing to be bound by a theory it is believed that the polycarbonate structural units in the polyurethane urea coating promote the adhesion to the expanded TPU surface. Moreover, it is believed that by using water as set forth in the following, the adhesion of the polyurethane urea coating and the expanded TPU surface can be additionally improved, preferably synergistically improved. Using a water-based polyurethane urea solution/dispersion it is believed that the surface of the expanded TPU is partly dissolved, i. e. is partly swollen. The polyurethane urea polymer chains being present in the solution/dispersion therefore can partly penetrate the loosened network of the expanded TPU surface, leading to a physical entrapment of the polyurethane urea upon evaporation of the water (formation of an interpenetrating network). However, because the expanded TPU surface is only slightly swollen, the expanded TPU bulk properties are not noticeably influenced by this process and are apparently completely maintained.

Moreover, it has been surprisingly found that the adhesion of the polyurethane urea coating comprising polycarbonate structural units is sufficient even when the article is bent or flexed. Therefore, a stable coating on expanded TPU is obtained, the adhesion of which is maintained even when the article is bent or flexed. At the same time the properties, i. e. mechanical and/or functional properties, of the expanded TPU substrate are maintained, preferably at temperatures in the range of from −20 to +40° C.

Additionally, by coating the expanded TPU substrate the water resistance, chemical resistance, scratch resistance, ultraviolet resistance and/or durability of the substrate was successfully improved compared to TPU surfaces without the coating. Especially, the soil resistance of the surface of the expanded TPU can be increased by the coating compared to TPU surfaces without the coating. Furthermore, the roughness of the surface of the expanded TPU can be decreased compared to TPU surfaces without the coating.

According to the present invention the expression "expanded TPU" refers to a particle foam made of thermoplastic polyurethane. Preferably, this term refers to a product which is obtained by providing the expanded TPU particles and shaping them in a mould. Preferably, no washing or cleaning of this resulting shaped article is performed which is capable and/or intended to remove the additives, preferably lubricants, being potentially present on the surface of the expanded TPU particles. This does not, however, mean that the expanded TPU has not been cleaned in a conventional manner usually used before the coating of a substrate, e. g. removal of dust etc., whereby some additives on the surface of the expanded TPU substrate are unintentionally removed. If necessary a PU cleaner can be used, preferably based on acetone or alcohols which might preferably comprise less than 5 wt.-% of an ionic or anionic surfactant. Examples of PU cleaners are PUSR500 of Würth (Adolf Würth GmbH & Co. KG, Künzelsau-Gaisbach, Germany), CC-PU-Reiniger of Dr. Schutz (CC-Dr-Schutz GmbH, Bonn, Germany) or the like. Therefore, preferably the expanded TPU substrate comprises essentially most of the additives being present due to its process of product. Preferably, the expanded TPU substrate comprises 0.1 to 10 parts by weight, more preferably 0.25 to 7.55 parts by weight, most preferably 0.5 to 6 parts by weight of at least one lubricant, based on 100 parts of the expanded TPU when subjected to coating. The lubricant can be present homogenously dispersed in the expanded TPU substrate. However, preferably it is accumulated at the surface of the expanded TPU particles. According to the present invention the term "lubricant" preferably refers to an agent which is capable of maintaining or enhancing the flowability of the polymer particles which will be expanded.

Preferably, the expanded TPU has a closed cell structure.

Suitable TPUs as well as methods of preparing an expanded TPU substrate are known to the person skilled in the art. Preferably, the expanded TPU substrate is produced according to any one of the processes as described in WO 94/20568 A1, WO 2007/082838 A1, WO 2005/023920 A1, WO 2007/045586 A1, WO 2010/136398 A1, WO 2014/126799 A1 and WO 2013/153153 A1 which are incorporated herein as reference with respect to the product of the expanded TPU and/or expanded TPU substrate.

Preferably, TPU is produced by reaction of a mixture of isocyanates (a) with compounds (b) reactive toward isocyanates, preferably with a molar mass of from 0.5 kg/mol to 10 kg/mol, and, if appropriate, with chain extenders (c), preferably with a molar mass of from 0.06 kg/mol to 0.5 kg/mol. In other preferred embodiments, for the production of TPU, at least one chain regulator (c1), and at least one catalyst (d) and, if appropriate, at least one filler, auxiliary, and/or at least one additive (e) are also added to the mixture.

Components (a), (b), (c), (c1), (d), and (e) usually used during the production of the TPUs are described by way of example below and comprise the following groups of substances: isocyanates (a), compounds (b) reactive toward isocyanates, chain extenders (c), chain regulators (c1), catalysts (d), and/or at least one conventional filler, auxiliary, and/or additive (e).

TPU production always requires a mixture composed of isocyanates (a) and compounds (b) reactive toward isocyanates. The further addition of components (c), (c1), (d), and (e) is optional and can take place individually or by using any of the possible variants. Component here means an individual substance or a mixture of the substances within said component.

The components isocyanates (a), compounds (b) reactive toward isocyanates, and chain extenders (c), and also the chain regulators (c1), if they are used, are termed structural components. In preferred embodiments, the organic isocyanates (a) used comprise aliphatic, cycloaliphatic, araliphatic, and/or aromatic isocyanates, and also preferred diisocyanates. Examples of preferred diisocyanates are tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'-, and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and phenylene diisocyanate.

In preferred embodiments, the compounds (b) used that are reactive toward isocyanates comprise polyesterols, polyetherols, and/or polycarbonatediols, for which another customary general term is "polyols".

TPU is preferably produced from at least one polyether alcohol, and it is particularly preferable to use at least one polyetherdiol. Accordingly, the resulting expanded thermoplastic polyurethane preferably comprises at least one polyether. Very particularly preferred polyetherdiols are polyethylene glycol and polypropylene glycol. The polyether alcohols are preferably used with a molar mass from 0.6 kg/mol to 4.5 kg/mol, particularly preferably with a molar mass from 0.8 to 2.5 kg/mol. The polyether alcohols are used individually or else in the form of a mixture of various polyether alcohols.

In alternative embodiments, TPU is produced from polyester alcohol. In one preferred embodiment, polyesterdiol is used for this purpose. One preferred polyesterdiol is produced from adipic acid and 1,4-butanediol. Preferred embodiments of the polyester alcohols have a molar mass from 0.6 kg/mol to 4.0 kg/mol, particularly preferably with a molar mass from 0.8 to 2.5 kg/mol.

In embodiments to which further preference is given, the average functionality of said polyols is from 1.8 to 2.3, or preferably from 1.9 to 2.2, in particular 2.

The chain extenders (c) used in preferred embodiments comprise aliphatic, araliphatic, aromatic, and/or cycloaliphatic compounds, which in embodiments to which further preference is given have a molar mass of from 0.06 kg/mol to 0.5 kg/mol. In some preferred embodiments, chain extenders (c) are compounds having two functional groups, for example diamines and/or alkanediols having from 2 to 10 carbon atoms in the alkylene radical, in particular 1,2-ethanediol, 1,4-butanediol, 1,6-hexanediol, and/or di-, tri-, tetra-, penta-, hexa-, hepta-, octa-, nona-, and/or decaalkylene glycols having from 4 to 20 carbon atoms, and corresponding oligo- and/or polypropylene glycols. In further embodiments, mixtures of the mentioned chain extenders are used for the production of TPU.

Some embodiments use chain regulators (c1), usually with a molar mass of from 0.03 kg/mol to 0.5 kg/mol. Chain regulators are compounds which have only one functional group relevant to isocyanates. Examples of chain regulators are monohydric alcohols, monofunctional amines, preferably 1-butylamine, 1-hexylamine, and/or monohydric polyols, preferably 1-butanol, 1-hexanol and 1-octanol. Chain regulators can be used to adjust flow properties as desired in the mixtures composed of the individual components.

The amount of chain regulators used in preferred embodiments is from 0% by weight to 5% by weight, more preferably from 0.1% by weight to 1% by weight, based on the compound b) reactive toward isocyanates. Chain regulators are used in addition to chain extenders or instead of these.

In further embodiments, at least one catalyst (d) is used for TPU production and in particular accelerates the reaction between the NCO groups of the diisocyanates (a) and the compounds reactive toward isocyanates, preferably hydroxy groups of structural components (b), (c), and (c1). In preferred embodiments, the catalyst has been selected from the group of the tertiary amines, e.g. triethylamine, dimethylcyclohexylamine, N-methylmorpholine, N,N'-dimethylpiperazine, 2-(dimethylaminoethoxy)ethanol, diazabicyclo [2.2.2]octane, and similar substances. In embodiments to which further preference is given, the at least one catalyst has been selected from the group of the organometallic compounds and examples that may be mentioned are titanic esters, an iron compound, e.g. iron(III) acetylacetonate, a tin compound, e.g. stannous diacetate, stannous dioctoate, stannous dilaurate, or a dialkyltin salt of an aliphatic carboxylic acid, e.g. dibutyltin diacetate, dibutyltin dilaurate, or the like.

Some embodiments use the catalysts individually, and other embodiments use mixtures of at least two catalysts mentioned. In preferred embodiments, the amounts used of the catalyst or of the mixture of catalysts are from 0.0001% by weight to 0.1% by weight based on the compound (b) reactive toward isocyanates, preferably polyhydroxy compound. Hydrolysis stabilizers, such as polymeric and low-molecular-weight carbodiimides, can also be added to structural components (a) to (c) and, if appropriate, (c1), either alongside catalysts (d) or without use of catalysts.

In a further embodiment, the TPU can comprise a phosphorus compound. The phosphorus compounds used in one preferred embodiment comprise organophosphorus compounds of trivalent phosphorus, e.g. phosphites and phosphonites. Examples of suitable phosphorus compounds are triphenyl phosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, di(2,4-di-tert-butylphenyl)pentaerythritol diphosphite, tristearyl sorbitol triphosphite, tetrakis(2,4-di-tert-butylphenyl) 4,4'-diphenylene diphosphonite, triisodecyl phosphite, diisodecylphenyl phosphite, and diphenyl isodecyl phosphite, or a mixture thereof.

Particularly preferred embodiments comprise phosphorus compounds which are difficult to hydrolyze, because hydrolysis of a phosphorus compound to the corresponding acid can lead to damage to the polyurethane, in particular to the polyester urethane. Accordingly, particularly for polyester urethanes, suitable phosphorus compounds are those which are particularly hydrolysis-resistant. Preferred embodiments of hydrolysis-resistant phosphorus compounds are dipolypropylene glycol phenyl phosphite, triisodecyl phosphite, triphenyl monodecyl phosphite, triisononyl phosphite, tris (2,4-di-tert-butylphenyl)phosphite, tetrakis(2,4-di-tert-butylphenyl) 4,4'-diphenylene diphosphonite, and di(2,4-di-tert-butylphenyl)pentaerythritol diphosphite, or a mixture thereof.

In a further embodiment, the TPU can comprises further additives like antioxidants, light stabilizers, UV stabilizers, optical brighteners and mold release agents.

The molar ratios of structural components (b) and (c) can be varied relatively widely. In preferred embodiments, the molar ratio of component (b) with respect to the total amount of chain extender (c) used varies from 10:1 to 1:10, preferably from 5:1 to 1:8, more preferably from 3:1 to 1:4, and the hardness of TPU here rises as content of chain extender (c) increases.

As has been explained above, the resulting expanded TPU particles are provided, prior to and/or after the expansion process, with at least one lubricant. Examples of suitable lubricants are talc, metal compounds, such as tricalcium phosphate, calcium carbonate, silicas, in particular fumed silicas, such as Aerosil® from Degussa, salts of long-chain (e.g. C10-22) carboxylic acids, for example stearic salts, such as calcium stearate, esters of long-chain carboxylic acids, e.g. glycerol esters, such as the glycerol stearates, silicone oils and polytetrafluoroethylene. The lubricant is generally applied to the optionally expanded TPU particles via mixing, spray application, drum application, or other conventional processes. It is usually used in amounts of from 0.01 to 20 parts by weight, preferably from 0.1 to 10 parts by weight, particularly preferably from 0.5 to 6 parts by weight, based on 100 parts by weight of the optionally expanded TPU.

According to a preferred embodiment of the article the expanded thermoplastic polyurethane preferably additionally comprises at least one lubricant. More preferably, the at least one lubricant is selected from the group consisting of talc, a metal compound, silica, a salt of a C10 to C22 carboxylic acid, an ester of a C10 to C22 carboxylic acid, a silicone oil, polytetrafluoroethylene or combinations of at least two thereof. Still preferably, the at least one lubricant is selected from the group consisting of a stearate, talc, a silicone oil, an ester of glycerol, polytetrafluoroethylene or combinations of at least two thereof.

According to the present invention the expanded TPU substrate is at least partially coated with a coating which is obtained by curing a polyurethane urea solution/dispersion, wherein the polyurethane urea comprises polycarbonate structural units.

According to the present invention the term "coating" refers to a layer which is in contact to the substrate via a defined interface. Examples of a defined interface are a direct contact of the coating to the surface, a regionally defined contact or the like. Preferably, the coating is thinner than the substrate itself. Preferably, the coating has a thickness in a range of from 1 to 100 µm, or preferably in a range of from 1.5 to 50 µm, or preferably in a range of from 3 to 25 µm.

Respective polyurethane urea solutions which are used in order to coat the expanded TPU substrate are known to the person skilled in the art.

In a preferred embodiment of the article, the polyurethane urea is obtained by a reaction of at least the following educts:
 a) a polycarbonatediol,
 b) an aliphatic or cycloaliphatic diamine or hydrazine, as a chain extender, and
 c) an aliphatic, cycloaliphatic or aromatic diisocyanate.

More preferably, the polyurethane urea according to the present invention is obtained by a reaction of at least the following educts:
 a) at least one macrodiol (polyetherdiol, polyesterdiol or polycarbonatediol) having a molecular weight of between 600 and 4000 g/mol, particularly preferably of between 1000 and 3000 g/mol, or mixtures of at least two of said macrodiol components, or mixtures of one of said macrodiols with a short-chain aliphatic diol having a molecular weight of between 50 and 500 g/mol, 0.2-0.5 mol of the short-chain aliphatic diol being added per mol of macrodiol, with the proviso that at least one polycarbonatediol is used;
 b) 0.5-2.0 mol of an aliphatic or cycloaliphatic diamine or hydrazine per mol of macrodiol, as a so-called chain extender, and
 c) 1.5-3.0 mol of an aliphatic, cycloaliphatic or aromatic diisocyanate, preferably an aliphatic or cycloaliphatic diisocyanate, per mol of macrodiol.

Macrodiols a), i.e. preferably polyhydroxyl compounds having a mean hydroxyl functionality of about 1.8 to 2.2, or preferably of 1.95 to 2.05, are basically suitable with the proviso that at least one polycarbonatediol is used. A higher degree of branching of the macrodiols is to be avoided because the high degree of crosslinking gives the resulting polyurethane urea solutions a very high viscosity, which is disadvantageous for processing as a coating solution/dispersion.

Suitable polycarbonatediols are those which can be prepared e.g. by reacting diols, such as 1,3-propanediol, 1,4-butanediol, 1,6-hexanediol or di-, tri- or tetraethylene glycol, with diaryl or dialkyl carbonates or phosgene. Preferred polycarbonatediols are those based on 1,6-hexanediol as well as co-diols having a modifying action, e.g. 1,4-butanediol, or ε-caprolactone.

Suitable polyethers containing hydroxyl groups are those prepared by the polymerization of cyclic ethers, such as ethylene oxide, propylene oxide, butylene oxide, tetrahydrofuran, styrene oxide or epichlorohydrin, with themselves, e.g. in the presence of $BF_3$, or by the addition of these ring compounds, optionally in a mixture or in succession, onto starter components having reactive hydrogen atoms, such as alcohols and amines, examples being water, ethylene glycol, 1,2-propylene glycol or 1,3-propylene glycol.

Suitable polyesters containing hydroxyl groups are e.g. reaction products of polyhydric alcohols, preferably dihydric alcohols, with polybasic carboxylic acids, preferably dibasic carboxylic acids. In place of the free carboxylic acids, the polyesters can also be prepared using the corresponding polycarboxylic anhydrides or corresponding polycarboxylic esters of lower alcohols, or mixtures of at least two thereof.

The polycarboxylic acids can be of an aliphatic, cycloaliphatic, aromatic and/or heterocyclic nature and can optionally be substituted, e.g. by halogen atoms, and/or unsaturated. The following may be mentioned as examples: succinic acid, adipic acid, sebacic acid, phthalic acid, isophthalic acid, trimellitic acid, phthalic anhydride, tetrahydrophthalic anhydride, hexahydrophthalic anhydride, tetrachlorophthalic anhydride, glutaric anhydride, maleic acid, maleic anhydride, fumaric acid or dimethyl terephthalate.

Examples of suitable polyhydric alcohols are ethylene glycol, 1,2-propylene glycol, 1,3-propylene glycol, 1,4-butylene glycol, 2,3-butylene glycol, 1,6-hexanediol, 1,8-octanediol, neopentyl glycol or 2-methyl-1,3-propanediol. Polyesters from lactones, e.g. ε-caprolactone, can also be used.

Examples of suitable short-chain aliphatic diols are ethylene glycol, propylene glycol, neopentyl glycol, diethylene glycol, triethylene glycol, diethanolamine, 2-ethyl-1,3-hexanediol, N-methyldiisopropanolamine, 1,3-propanediol, 1,4-propanediol, 1,3-butanediol, 1,4-butanediol or 1,6-hexanediol. 0.2-0.5 mol of the short-chain aliphatic diol is added per mol of macrodiol.

So-called chain extenders b) are also preferably used to produce the polyurethane urea solution/dispersion which is used according to the invention. Such chain extenders are hydrazine or aliphatic diamines, e.g. ethylenediamine, propylenediamine, 1,6-hexamethylenediamine or other aliphatic diamines Cycloaliphatic diamines such as 1,4-bis(amino-methyl)cyclohexane, 4,4'-diamino-3,3'-dimethyldicyclohexylmethane and other ($C_1$-$C_4$)-dialkyl- and ($C_1$-$C_4$)-tetraalkyl-dicyclohexylmethanes, e.g. 4,4'-diamino-3,5-diethyl-3',5'-diisopropyldicyclohexylmethane, are also suitable. 1-Amino-3,3,5-trimethyl-5-aminomethylcyclohexane (isophoronediamine) and 4,4'-diaminodicyclohexylmethane are preferred.

About 0.5-2.0 mol, preferably 0.6-1.7 mol, of chain extenders b) are used per mol of macrodiol mixture a).

It is conventional to use approximately equivalent amounts of chain extenders, based on the isocyanate remaining after subtraction of the proportion of isocyanate that has reacted with the macrodiol mixture. It is preferable, however, to use less than the equivalent amount, down to about 30-80% of the NCO groups. The residual NCO groups can be reacted with monofunctional terminators such as butylamine, stearylamine, trialkoxysilylpropanamine, butanone oxime or morpholine. This prevents an excessive growth of the molecular weight or crosslinking and branching reactions. The alcohols contained in the solvent mixture can also act in this form as chain extenders.

The diisocyanates c) which can be used are all the aliphatic, cycloaliphatic and/or aromatic isocyanates known to those skilled in the art which have a mean NCO functionality of 1, preferably of 2, individually or in any desired mixture with one another, it being unimportant whether they have been prepared by phosgene processes or phosgene-free processes.

It is preferable to use isocyanates from the aliphatic or cycloaliphatic series, their carbon skeleton (excluding the NCO groups present) having 3 to 30 carbon atoms, preferably 4 to 20 carbon atoms.

Particularly preferred compounds of component c) correspond to the aforementioned type with aliphatically and/or cycloaliphatically bonded NCO groups, such as bis(isocyanatoalkyl) ethers, bis- and tris(isocyanato-alkyl)benzenes, -toluenes and -xylenes, propane diisocyanates, butane diisocyanates, pentane diisocyanates, hexane diisocyanates (e.g. hexamethylene diisocyanate, HDI), heptane diisocyanates, octane diisocyanates, nonane diisocyanates (e.g. trimethyl-HDI (TMDI), normally as a mixture of the 2,4,4 and 2,2,4 isomers), nonane triisocyanates (e.g. 4-isocyanatomethyl-1,8-octane diisocyanate), decane diisocyanates, decane triisocyanates, undecane diisocyanates, undecane triisocyanates, dodecane diisocyanates, dodecane triisocyanates, 1,3- and 1,4-bis(isocyanatomethyl)cyclohexanes ($H_6XDI$), 3-isocyanatomethyl-3,5,5-trimethylcyclohexyl isocyanate (isophorone diisocyanate, IPDI), bis(4-isocyanatocyclohexyl)methane ($H_{12}MDI$) or bis(isocyanatomethyl)norbornane (NBDI).

Very particularly preferred compounds of component (c) are hexamethylene diisocyanate (HDI), trimethyl-HDI (TMDI), 2-methyl-1,5-pentane diisocyanate (MPDI), isophorone diisocyanate (IPDI), 1,3- and 1,4-bis(isocyanatomethyl)cyclohexane ($H_6XDI$), bis(isocyanatomethyl)norbornane (NBDI), 3(4)-isocyanatomethyl-1-methylcyclohexyl isocyanate (IMCI) and/or 4,4'-bis(isocyanatocyclo-hexyl)methane ($H_{12}MDI$), or mixtures of at least two of these isocyanates.

About 1.5-3.0 mol, preferably 1.7-2.8 mol, of diisocyanate component c) are used per mol of macrodiol mixture a).

To prepare the aqueous polyurethane dispersions (PU dispersions) of the invention it is possible to use all of the methods known in the art, such as the prepolymer mixing method, acetone method or melt dispersing method, for example. The PU dispersions of the invention are prepared preferably by the acetone method.

For preparing the PU dispersion by the acetone method, the constituents a) and b) and optionally catalysts (d) like mentioned above and/or additives (e) as mentioned above, wherein a), b), (d) and (e) should all contain no primary or secondary amino groups. The polyisocyanate component c) for preparing an isocyanate-functional polyurethane prepolymer, are usually introduced as an initial charge, in whole or in part, diluted optionally with a solvent which is miscible with water but inert towards isocyanate groups, and heated to temperatures in the range from 50 to 120° C. To accelerate the isocyanate addition reaction it is possible to use the catalysts that are known in polyurethane chemistry. Preference is given to dibutyltin dilaurate.

Suitable solvents are the customary aliphatic, keto-functional solvents such as acetone or butanone, for example, which can be added not only at the beginning of the preparation but also, optionally, in portions later on. Acetone and butanone are preferred. Other solvents such as, for example, xylene, toluene, cyclohexane, butyl acetate, methoxypropyl acetate, N-methylpyrolidene solvents with ether units or ester units, may likewise be employed and distilled off in whole or in part, or may remain completely in the dispersion.

Subsequently any constituents from a) to (e) that were not added at the beginning of the reaction are metered in.

With regard to the preparation of the polyurethane prepolymer, the molar ratio of isocyanate groups to isocyanate-reactive groups is 1.0 to 3.5, preferably 1.2 to 3.0, more preferably 1.3 to 2.5.

The reaction of components a), b), c), (d) and/or (e) to form the prepolymer takes place partially or completely, but preferably completely. In this way polyurethane prepolymers containing free isocyanate groups are obtained, in bulk (without solvent) or in solution.

The preparation of the polyurethane prepolymers is accompanied or followed, if it has not yet been carried out in the starting molecules, by the partial or complete formation of salts of the anionically and/or cationically dispersing groups.

In the case of anionic groups, use is made for this purpose of bases such as tertiary amines, examples being trialkylamines having 1 to 12, preferably 1 to 6, C atoms in each alkyl radical. Examples thereof are trimethylamine, triethylamine, methyldiethylamine, tripropylamine, N-methylmorpholine, methyldiisopropylamine, ethyldiisopropylamine and diisopropylethylamine. The alkyl radicals may also, for example, bear hydroxyl groups, as in the case of the dialkylmonoalkanolamines, alkyldialkanolamines and trialkanolamines. As neutralizing agents it is also possible optionally to use inorganic bases, such as ammonia or sodium hydroxide and/or potassium hydroxide. Preference is given to triethylamine, triethanolamine, dimethylethanolamine or diisopropylethylamine.

The molar amount of the bases is between 50% and 125%, preferably between 70% and 100%, of the molar amount of the anionic groups.

In the case of cationic groups, dimethyl sulphate or succinic acid or phosphoric acid are used. Neutralization may also take place simultaneously with dispersing, with the dispersing water already containing the neutralizing agent.

Subsequently, in a further process step, if it has not yet happened or has taken place only partially, the prepolymer obtained is dissolved using aliphatic ketones such as acetone or butanone.

Subsequently, possible $NH_2$-functional and/or NH-functional components are reacted with the remaining isocyanate groups. This chain extension/chain termination may be carried out either in solvent prior to dispersing, during dispersing, or in water after dispersing. Chain extension is preferably carried out prior to dispersing in water.

Where chain extension is carried out using compounds corresponding to the definition of b) with $NH_2$ groups or NH groups, the prepolymers are preferably chain-extended before the dispersing operation.

The degree of chain extension, in other words, 100% multiplied by the equivalent ratio of NCO-reactive groups of the compounds used for chain extension to free NCO groups of the prepolymer, is between 40% to 150%, preferably between 50% to 120%, more preferably between 60% to 120%.

The aminic components may optionally be used in water- or solvent-diluted form in the process of the invention, individually or in mixtures, with any sequence of addition being possible.

If water or organic solvents are used as diluents, the diluent content is preferably 70% to 95% by weight.

The preparation of the PU dispersion from the prepolymers takes place following chain extension. For that purpose the dissolved and chain-extended polyurethane polymer either is introduced into the dispersing water with strong shearing, such as vigorous stirring, for example, or, conversely, the dispersing water is stirred into the prepolymer solutions. Preferably the water is introduced into the dissolved prepolymer.

The solvent still present in the dispersions after the dispersing step is usually subsequently removed by distillation. Its removal during dispersing is also a possibility.

The solid content of the PU dispersion is preferably between 5% to 70%, or preferably 6% to 60%, or preferably 7% to 50%, or preferably 8% to 40% by weight. In a preferred embodiment of the article the solid content of the water-based polyurethane urea solution/dispersion is in a range of from 35 to 60 wt.-%, or preferably in a range of from 40 to 50 wt.-%, based on the total weight of the polyurethane urea solution/dispersion.

The PU dispersions of the invention may comprise antioxidants and/or light stabilizers and/or other auxiliaries and additives such as, for example, emulsifiers, defoamers, thickeners. Finally it is also possible for fillers, plasticizers, pigments, carbon-black sols and silica sols, aluminum dispersions, clay dispersions and asbestos dispersions, flow control agents or thixotropic agents to be present beyond component (e). Depending on the desired pattern of properties and intended use of the PU dispersions of the invention it is possible for up to 70%, based on total dry-matter content, of such fillers to be present in the end product.

Preferably, the resulting polyurethane urea comprises alkoxysilane structural units. These structural units are preferably introduced in the polyurethane urea by use of an alkoxysilane group containing stopper agent. Preferably, the structural unit is introduced by using at least one compound containing at least one alkoxysilane group and an isocyanate-reactive group. Alkoxysilanes compounds which preferably are aminoalkylsiloxanes, such as e.g. 3-aminopropyltriethoxysilane, 3-aminopropyltrimethoxysilane, 3-aminopropyltributoxysilane, 2-aminoethyltriethoxysilane, 2-aminoethyltrimethoxysilane, 2-aminoethyltributoxysilane, 4-aminobutyltriethoxysilane, 4-aminobutyltrimethoxysilane, reaction products of the alkoxysilanes mentioned with maleic acid dialkyl esters, such as e.g. maleic acid diethyl ester, maleic acid dimethyl ester or maleic acid dibutyl ester, N-phenylaminopropyltrimethoxysilane, bis-(3-trimethoxysilylpropyl)amine, compounds of the type mentioned in which one or two of the alkoxy groups are replaced by alkyl groups and mixtures of at least two of the alkoxysilanes mentioned and also other alkoxysilanes.

It has been found that the alkoxysilane structural units improve the stability of the resulting polyurethane urea coating to hydrolysis. Moreover, the adhesion to the expanded TPU substrate is additionally improved.

In one aspect of the present invention the polyurethane urea solution/dispersion additionally comprises at least one colorant. Accordingly, by coating the expanded TPU substrate its appearance can be improved in terms of providing a color and/or a pattern. The article according to the present invention can be more conveniently produced than known articles which are dyed, because the at least one color can be precisely located, i. e. specifically provided where desired.

Conventional additives and auxiliary substances, such as agents for improving handle, dyestuffs, matting agents, UV stabilizers, phenolic antioxidants, light stabilizers, hydrophobizing agents and/or flow control agents, can be used concomitantly.

In a preferred embodiment of the present invention, the polyurethane urea solution/dispersion additionally comprises at least one polyisocyanate. This additional polyisocyanate improves the bonding strength between the substrate and the coating. Preferably, the additional polyisocyanate is an oligomeric polyisocyanate. The polyisocyanates which can be used are preferably all the aliphatic, cycloaliphatic and/or aromatic isocyanates known to those skilled in the art which have a mean NCO functionality of >1, preferably of >2, individually or in any desired mixtures with one another, it being unimportant whether they have been prepared by phosgene processes or phosgene-free processes. More preferably, the polyisocyanate is an oligomeric polyisocyanate selected from the group consisting of uretdione, isocyanurate, iminooxadiazinedione and/or oxadiazinetrione structure and biuretized diisocyanates or mixtures of at least two thereof. Preferably, the polyisocyanate is a polymerized, for example trimerized or biuretized aliphatic, araliphatic or aromatic diisocyanate. Suitable such modification reactions of isocyanates are, for example, the conventional processes for catalytic oligomerization of isocyanates to form uretdione, isocyanurate, iminooxadiazinedione, urethane, allophanate and/or oxadiazinetrione structure or for biuretization of diisocyanates, such as are described by way of example e.g. in Laas et al., *J. Prakt. Chem.* 336, 1994, 185-200, in DE-A 1 670 666 and EP-A 0 798 299. Concrete descriptions of such polyisocyanates based on araliphatic diisocyanates are also to be found e.g. in EP-A 0 081 713, EP-A 0 197 543, GB-A 1 034 152 and JP-A 05286978.

Particularly preferred polyisocyanates are those with aliphatically and/or cycloaliphatically bonded NCO groups, such as bis(isocyanatoalkyl) ethers, bis- and tris(isocyanatoalkyl) benzenes, -toluenes and -xylenes, propane diisocyanates, butane diisocyanates, pentane diisocyanates, hexane diisocyanates (e.g. hexamethylene diisocyanate, HDI), heptane diisocyanates, octane diisocyanates, nonane diisocyanates (e.g. trimethyl-HDI (TMDI), normally as a mixture of the 2,4,4 and 2,2,4 isomers), nonane triisocyanates (e.g. 4-isocyanatomethyl-1,8-octane diisocyanate), decane diisocyanates, decane triisocyanates, undecane diisocyanates, undecane triisocyanates, dodecane diisocyanates, dodecane triisocyanates, 1,3- and 1,4-bis(isocyanatomethyl)cyclohexanes (H6XDI), 3-iso-cyanatomethyl-3,5,5-trimethylcyclohexyl isocyanate (isophorone diisocyanate, IPDI), bis(4-isocyanatocyclohexyl)methane (H12MDI) or bis (isocyanatomethyl)-norbornane (NBDI).

If an additional polyisocyanate is present in the polyurethane urea solution/dispersion it is preferred that it is present in an amount of 0.1 to 10.0 parts by weight, or preferably 0.2 to 8 parts by weight, or preferably 0.3 to 5.0 parts by weight, or preferably 0.5 to 4.0 parts by weight, each time preferably based on 100 parts by weight of the polyurethane urea solution. This amount of the additional polyisocyanate is effective in improving the bonding strength of the resulting polyurethane urea coating to the substrate and at the same time ensures that the coating itself is still flexible enough in order not to influence or having an impact on the properties of the expanded TPU substrate.

Preferably, the article according to the present invention is selected from the group consisting of a shoe sole, cushion, seats, e.g. car seats or child's seat, tubes, e.g. bicycle tubes, rolls, e.g. cabin rolls, bumpers, e.g. auto bumpers and mattresses or combinations of at least two thereof. Most preferably, the article according to the present invention is a shoe sole.

In another aspect of the present invention footwear is provided comprising the article according to the present invention.

According to the present invention the terms "comprising" and/or "containing" preferably mean "essentially comprising" and more preferably means "consisting of".

Any molecular mass which is recited in the present specification is a number-average molecular weight. The number-average molecular weight for the purposes of this specification is always determined by gel permeation chromatography (GPC) in tetrahydrofuran at 23° C. The procedure for this is in accordance with DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 μm; RID detector). Calibration takes place using polystyrene samples of known molar mass. The number-average molecular weight is calculated with software assistance. Baseline points and evaluation limits are specified in accordance with DIN 55672 Part 1.

Moreover, the present invention relates to a process for the production of the article according to the present invention as described in each embodiment above.

The process according to the present invention comprising the steps of:

1) providing a substrate comprising expanded thermoplastic polyurethane,
2) applying a water-based polyurethane urea solution/dispersion on at least a part of said substrate of step 1), wherein the polyurethane urea comprises polycarbonate structural units,
3) curing said water-based polyurethane urea solution/dispersion of step 2) in order to obtain a coating, and
4) optionally repeating steps 2) and 3) at least one time, wherein, when repeating step 2) the water-based polyurethane urea solution/dispersion is applied to the cured coating obtained in step 3) or in repeated step 3).

The substrate and the water-based polyurethane urea solution/dispersion have been described in detail with respect to the article according to the present invention. All preferred embodiments and combinations of embodiments may be used in the process according to the present invention.

Preferably, in step 2) of the process according to the present invention the water-based polyurethane urea solution/dispersion is applied to the substrate by brushing, spraying, rolling, roll coating, slot coating, dipping and/or printing. The person skilled in the art is able to prepare respective solutions which exhibit the properties (viscosity etc.) which are needed for the respective application technique. However, it is preferred that the polyurethane urea solution/dispersion used in step 2) and/or when repeating step 2) has a viscosity in a range of from 10 to 50 seconds, or preferably of from 10 to 30 seconds according to DIN EN ISO 2431 (4 mm).

Still preferably, curing of the polyurethane urea solution/dispersion in step 3) is effected using heat. The temperature needs to be adapted to the properties of the substrate. Preferably, temperatures of 40 to 100° C., more preferably of 50 to 90° C. and most preferably of 60 to 80° C. are used.

In a preferred embodiment in step 4) steps 2) and 3) are repeated one time. This means that firstly the substrate comprising a cured coating is provided and on top of this cured coating a water-based polyurethane urea solution/dispersion, wherein the polyurethane urea comprises polycarbonate structural units, is applied to the cured coating. Thereby (at least) two layers of coating are built on the substrate. In this embodiment either the same water-based polyurethane urea solution/dispersion which has been used in step 2) can be used or a different water-based polyurethane urea solution/dispersion, wherein the polyurethane urea comprises polycarbonate structural units, can be used. Preferably, the different water-based polyurethane urea solution/dispersion used in the repeated step 2) comprises at least a different amount of water compared to the polyurethane urea solution/dispersion of the first step 2). This means that in a preferred embodiment in step 4) the polyurethane urea solution/dispersion which is used when repeating step 2) differs from the polyurethane urea solution/dispersion used in step 2) (i. e. when conducting step 2) for the first time), with the proviso that a water-based polyurethane urea solution/dispersion is used, wherein the polyurethane urea comprises polycarbonate structural units. Preferably, this polyurethane urea solution/dispersion is any one of the above-mentioned polyurethane urea solutions/dispersions.

In still another aspect the present invention relates to a use of a water-based polyurethane urea solution/dispersion for decorative coating of a substrate comprising expanded thermoplastic polyurethane, wherein the polyurethane urea comprises polycarbonate structural units.

EXAMPLES

Starting Materials

| Name of the raw material | Description of the raw material |
|---|---|
| Impranil DLU (Covestro Deutschland AG) | Aliphatic polycarbonateester-polyether polyurethane dispersion |
| Impranil ® DL 2077 XP (Covestro Deutschland AG) | Anionic polycarbonate polyurethane dispersion |
| Byk ® 348 (BYK-Chemie GmbH, Wesel) | Silicone surfactant for aqueous coatings |
| Byk ® 333 (BYK-Chemie GmbH, Wesel) | Silicone surfactant for aqueous coatings |
| Desmodur ® N3900 (Covestro Deutschland AG) | Low-viscosity, aliphatic polyisocyanate resin based on hexamethylene diisocyanate |
| Aquaderm ®-X black B-EXP (Lanxess AG) | Black pigment |

Example 1: Dispersion A

| | |
|---|---|
| Impranil ® DLU: | 800 g |
| Impranil ® DL 2077 XP: | 200 g |
| Byk ® 348 | 20 g |
| Byk ® 333 | 5 g |
| Desmodur ® N 3900 | 20 g |
| Aquaderm ®-X black B-EXP 2129 | 50 g |

Example 2: Solution/Dispersion A

| | |
|---|---|
| Impranil ® DLU: | 700 g |
| Impranil ® DL 2077 XP: | 300 g |
| Byk ® 348 | 20 g |
| Byk ® 333 | 5 g |
| Desmodur ® N 3900 | 20 g |
| Aquaderm ®-X black B-EXP 2129 | 50 g |

Preparation of Water-Based Polyurethane Urea Dispersion with Mixture A or B:

The mixture according to the partial amounts as mentioned above of the Impranil® DLU and Impranil® DL 2077 XP were stirred at 70° C. for 10 minutes. Afterwards the partial amounts as mentioned above of Byk® 348 and Byk® 333 were added and stirred for another 15 minutes at 70° C. Desmodur® N 3900 in its partial amount was added and finally the pigment Aquaderm®-X black was added. This mixture was stirred for another 10 minutes at 70° C.

The resulting dispersion A or B had a viscosity according to DIN EN ISO 2431 of 11 s.

Article According to the Invention

An expanded TPU shoe sole obtained according to example 1 in WO 2007/045586 A1 was cleaned by 2 ml/cm² of PUSR500 of Würth (Adolf Würth GmbH & Co. KG, Künzelsau-Gaisbach, Germany).

Dispersion A or B was applied to the cleaned expanded TPU substrate using a spray gun with an opening of 2.5 mm. The white substrate was coated until no white color of this substrate was visible any longer. The coated substrate was cured at 70° C. for 10 min.

The adhesion of the coating to the substrate was tested using a manual rubber/EVA laminating process. In this test a human tried by hand to separate the coating from the substrate by hand utilizing its entire force. No lamination of the coating could be determined.

In both examples 1 and 2, after drying of the coated substrate a surface with a dry touch is achieved which is flexible and will not peel off when utilized. As utilization a normal use of a shoe or other article of daily life is possible. The surface can be changed in color by adding different pigments.

The invention claimed is:

1. An article comprising expanded thermoplastic polyurethane as a substrate and a coating on at least a part of said substrate, wherein the coating is obtained by curing a water-based polyurethane urea solution and/or dispersion, wherein the polyurethane urea comprises polycarbonate structural units and is obtained by a reaction of educts, comprising:
    a) at least one macrodiol having a number average molecular weight of from 600 g/mol to 4000 g/mol, wherein the at least one macrodiol comprises a polycarbonatediol,
    b) from 0.5 mol to 2 mol of an aliphatic diamine, a cycloaliphatic diamine, or hydrazine per mol of the at least one macrodiol, and
    c) from 1.5 mol to 3 mol of an aliphatic, cycloaliphatic, or aromatic diisocyanate per mol of the at least one macrodiol.

2. The article according to claim 1, wherein the expanded thermoplastic polyurethane comprises at least one polyether.

3. The article according to claim 1, wherein the expanded thermoplastic polyurethane additionally comprises at least one lubricant.

4. The article according to claim 3, wherein the at least one lubricant comprises talc, a metal compound, silica, a salt of a C10 to C22 carboxylic acid, an ester of a C10 to C22 carboxylic acid, a silicone oil, polytetrafluoroethylene, or a combination of at least two thereof.

5. The article according to claim 1, wherein the polyurethane urea comprises alkoxysilane structural units.

6. The article according to claim 1, wherein the solid content of the water-based polyurethane urea solution and/or dispersion is in a range of from 35 to 60 wt.-%, based on the total weight of the polyurethane urea solution and/or dispersion.

7. The article according to claim 1, wherein the polyurethane urea solution and/or dispersion additionally comprises at least one colorant.

8. The article according to claim 1, wherein the polyurethane urea solution and/or dispersion additionally comprises at least one polyisocyanate.

9. The article according to claim 1, wherein the article is comprises a shoe sole, a seat, a car seat, a child's seat, a tube, a bicycle tube, a roll, a cabin roll, a bumper, an auto bumper, a cushion, a mattress, or a combination of at least two thereof.

10. Footwear comprising the article according to claim 1.

11. A process for the production of the article according to claim 1 comprising the steps of:
    1) providing a substrate comprising expanded thermoplastic polyurethane,
    2) applying a water-based polyurethane urea solution and/or dispersion on at least a part of said substrate of step 1), wherein the polyurethane urea comprises polycarbonate structural units and is obtained by a reaction of educts, comprising:
        a) at least one macrodiol having a number average molecular weight of from 600 g/mol to 4000 g/mol, wherein the at least one macrodiol comprises a polycarbonatediol,
        b) from 0.5 mol to 2 mol of an aliphatic diamine, a cycloaliphatic diamine, or hydrazine per mol of the at least one macrodiol, and
        c) from 1.5 mol to 3 mol of an aliphatic, cycloaliphatic, or aromatic diisocyanate per mol of the at least one macrodiol,
    3) curing said water-based polyurethane urea solution and/or dispersion of step 2) in order to obtain a coating, and
    4) optionally repeating steps 2) and 3) at least one time, wherein, when repeating step 2) the water-based polyurethane urea solution and/or dispersion is applied to the cured coating obtained in step 3) or in repeated step 3).

12. The process of claim 11, wherein in step 2) the water-based polyurethane urea solution and/or dispersion is applied to the substrate by brushing, spraying, rolling, roll coating, slot coating, dipping, printing, or a combination thereof.

13. The process according to claim 11, wherein the water-based polyurethane urea solution and/or dispersion has a viscosity of 10 to 30 seconds according to DIN EN ISO 2431.

14. A decorative coating of a substrate comprising an expanded thermoplastic polyurethane substrate coated at least in part with a water-based polyurethane urea solution and/or dispersion, wherein the polyurethane urea comprises polycarbonate structural units and at least one colorant.

* * * * *